(12) United States Patent
Kestell

(10) Patent No.: US 11,857,868 B1
(45) Date of Patent: Jan. 2, 2024

(54) AUTOMATED CONTROLLER CONFIGURATION RECOMMENDATION SYSTEM

(71) Applicant: Electronic Arts Inc., Redwood City, CA (US)

(72) Inventor: Stephen Roger Kestell, Vancouver (CA)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 17/894,082

(22) Filed: Aug. 23, 2022

Related U.S. Application Data

(63) Continuation of application No. 16/997,798, filed on Aug. 19, 2020, now Pat. No. 11,458,388.

(51) Int. Cl.
*A63F 13/42* (2014.01)
*A63F 13/22* (2014.01)
*A63F 13/23* (2014.01)
*G06N 20/00* (2019.01)

(52) U.S. Cl.
CPC .............. *A63F 13/23* (2014.09); *A63F 13/22* (2014.09); *A63F 13/42* (2014.09); *G06N 20/00* (2019.01)

(58) Field of Classification Search
CPC ........... A63F 13/22; A63F 13/23; A63F 13/42
See application file for complete search history.

(56) References Cited

U.S. PATENT DOCUMENTS

| | | |
|---|---|---|
| 5,451,053 A | 9/1995 | Garrido |
| 5,896,125 A | 4/1999 | Niedzwiecki |
| 8,142,286 B2 | 3/2012 | Sayyadi et al. |
| 2005/0113158 A1 | 5/2005 | Sterchi et al. |
| 2006/0097453 A1 | 5/2006 | Feldman et al. |
| 2011/0136568 A1 | 6/2011 | Buhr |
| 2019/0038967 A1 | 2/2019 | Rom et al. |
| 2019/0358545 A1* | 11/2019 | Aghdaie ................. A63F 13/67 |
| 2020/0265451 A1 | 8/2020 | McKinlay et al. |
| 2021/0236944 A1 | 8/2021 | Summa et al. |

OTHER PUBLICATIONS

Ramble Tan, "Community Configs—Beginner's Guide/ How To— Steam Controller Tutorial/ Tip," Feb. 16, 2017, https://www.youtube.com/watch?v=Gs8_-3TS-e8. (Year: 2017).

* cited by examiner

*Primary Examiner* — Jay Trent Liddle
(74) *Attorney, Agent, or Firm* — McDermott Will & Emery LLP

(57) ABSTRACT

Various aspects of the subject technology relate to systems, methods, and machine-readable media for adjusting controller settings. The method includes receiving, through a controller associated with a user, controller input for software. The method also includes determining, based on the controller input, a user profile for the user comprising at least a skill level and an input tendency of the user. The method also includes providing suggested adjustments to the controller settings intended to improve performance of the user in relation to the software, the controller settings comprising at least one of controller sensitivity or controller assignments. The method also includes receiving approval of the user to implement the suggested adjustments to the controller settings. The method also includes adjusting the controller settings based on the approval of the user.

18 Claims, 5 Drawing Sheets

AUTOMATED CONTROLLER CONFIGURATION RECOMMENDATION SYSTEM

CROSS REFERENCE TO RELATED APPLICATIONS

This present application claims the benefit of priority under 35 U.S.C. 120 as a continuation of U.S. patent application Ser. No. 16/997,798, filed Aug. 19, 2020, now allowed, the disclosure of which is hereby incorporated by reference in its entirety for all purposes.

TECHNICAL FIELD

The present disclosure generally relates to controller configurations, and more particularly to automated controller configuration recommendations.

BACKGROUND

Controllers may be utilized by users to interact with software. The controllers may translate the tactile input from the user into commands for the software. However, users are not all alike, and controller settings may not be optimized for each user. Although controller settings may be adjusted, they often include a myriad of customization options, and are therefore too cumbersome for users to customize on their own. As a result, the user experience in interacting with the software may become limited.

BRIEF SUMMARY

The subject disclosure provides for systems and methods for automated controller configuration recommendations. In an aspect, a machine learning system may account for how users are interfacing with software (e.g., a simulation, a video game, a developer tool, etc.) through a controller (e.g., analog/digital controllers including a gamepad, keyboard and mouse, a control surface, a handicapped accessible controller, steering wheel, flight stick, pedals, etc.). The system may provide recommendations for configuration settings of the controller to aid each user's respective tendencies. Additionally, configuration profiles can be shared on a social media platform and updated over time. The system may also account for configuration settings that are used by the most skilled users, and then makes a comparison to users who have similar tendencies to form recommendations. The system may further query the user for user approval for changes. The system may also be configured for automatic/dynamic adjustments, if desired by the user.

According to one embodiment of the present disclosure, a computer-implemented method for adjusting controller settings is provided. The method includes receiving, through a controller associated with a user, controller input for software. The method also includes determining, based on the controller input, a user profile for the user comprising at least a skill level and an input tendency of the user. The method also includes providing suggested adjustments to the controller settings intended to improve performance of the user in relation to the software, the controller settings comprising at least one of controller sensitivity or controller assignments. The method also includes receiving approval of the user to implement the suggested adjustments to the controller settings. The method also includes adjusting the controller settings based on the approval of the user.

According to one embodiment of the present disclosure, a system is provided including a processor and a memory comprising instructions stored thereon, which when executed by the processor, causes the processor to perform a method for adjusting controller settings. The method includes receiving, through a controller associated with a user, controller input for software. The method also includes determining, based on the controller input, a user profile for the user comprising at least a skill level and an input tendency of the user. The method also includes providing suggested adjustments to the controller settings intended to improve performance of the user in relation to the software, the controller settings comprising at least one of controller sensitivity or controller assignments. The method also includes receiving approval of the user to implement the suggested adjustments to the controller settings. The method also includes adjusting the controller settings based on the approval of the user.

According to one embodiment of the present disclosure, a non-transitory computer-readable storage medium is provided including instructions (e.g., stored sequences of instructions) that, when executed by a processor, cause the processor to perform a method for adjusting controller settings. The method includes receiving, through a controller associated with a user, controller input for software. The method also includes determining, based on the controller input, a user profile for the user comprising at least a skill level and an input tendency of the user. The method also includes providing suggested adjustments to the controller settings intended to improve performance of the user in relation to the software, the controller settings comprising at least one of controller sensitivity or controller assignments. The method also includes receiving approval of the user to implement the suggested adjustments to the controller settings. The method also includes adjusting the controller settings based on the approval of the user.

According to one embodiment of the present disclosure, a system is provided that includes means for storing instructions, and means for executing the stored instructions that, when executed by the means, cause the means to perform a method for adjusting controller settings. The method includes receiving, through a controller associated with a user, controller input for software. The method also includes determining, based on the controller input, a user profile for the user comprising at least a skill level and an input tendency of the user. The method also includes providing suggested adjustments to the controller settings intended to improve performance of the user in relation to the software, the controller settings comprising at least one of controller sensitivity or controller assignments. The method also includes receiving approval of the user to implement the suggested adjustments to the controller settings. The method also includes adjusting the controller settings based on the approval of the user.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
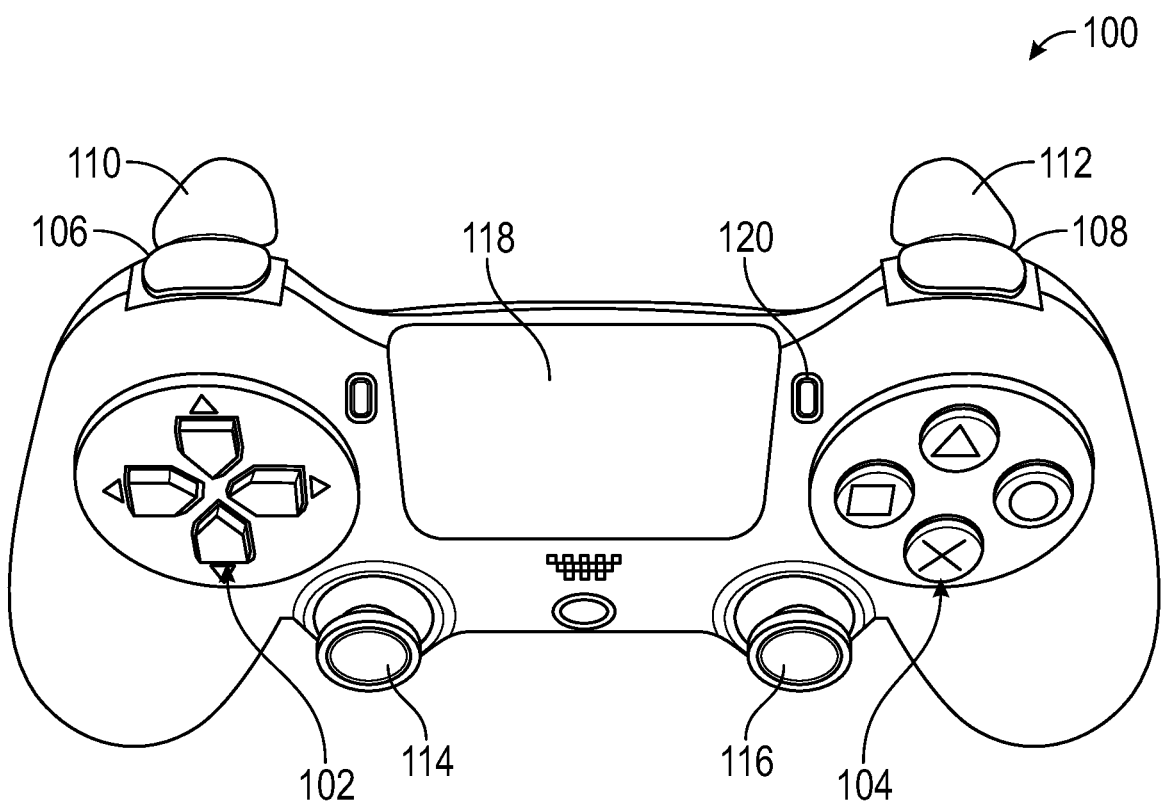
FIG. 1 illustrates an exemplary controller, according to certain aspects of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

Controllers may be utilized by users to interact with software. The controllers may translate the tactile input from the user into commands for the software. Typically, the default controller configuration for software focuses on ease of learning, and generally is not optimized for skilled performance. However, users are not all alike, and the default controller settings may not be optimized for each user. Although controller settings may be adjusted, they often include myriad customization options, and are therefore too cumbersome for users to customize on their own. As a result, the user experience in interacting with the software may become limited, and the user may eventually quit interactions with the software altogether.

Furthermore, controller assignments are no longer just straight forward button assignments and preferred layouts. With multiple analog inputs (e.g., triggers and thumb sticks) as well as multiple game/player states that exist (e.g., running, jumping, flying, driving, aiming, etc.), input mapping has become highly customizable and highly personalized. A user's controller layout (including analog sensitivities) and game settings (turning on/off certain features) can be a competitive advantage. In most competitive/e-sports style games, the default controls are almost never used by high level players. The defaults are designed to be simple and easy to pick up but usually have major disadvantages. For example, in a shooter with the jump button assigned to the face of the controller, a player cannot aim while jumping because the user's right thumb is needed for both. Additionally, joystick/thumb stick sensitivity almost always defaults quite low for ease of control, but a high sensitivity would allow players to turn around faster when approached from behind, for example.

Aspects of the present disclosure address these issues by providing for systems and methods for automated controller configuration recommendations. In an aspect, a machine learning system may account for how users are interfacing with software (e.g., a simulation, a video game, a developer tool, etc.) through a controller (e.g., analog/digital controllers including a gamepad, keyboard and mouse, a control surface, a handicapped accessible controller, steering wheel, flight stick, pedals, etc.). The system may provide recommendations for configuration settings of the controller to aid each user's respective tendencies. Additionally, configuration profiles (e.g., user profiles) can be shared on a social media platform and updated over time. This allows for the users to follow each other through their profiles. For example, a user may follow their friends and/or favorite streamers, etc., and may receive notifications of controller configuration changes to those profiles. The user may then also incorporate and merge down the controller configuration changes to their own profile. The system may also account for configuration settings that are used by the most skilled users, and then makes a comparison to users who have similar tendencies to form recommendations. The system may further query the user for user approval for changes. The system may also be configured for automatic/dynamic adjustments, if desired by the user.

The disclosed system addresses a problem in traditional controllers tied to computer technology, namely, the technical problem of adjusting controller settings to fit each user's tendencies. The disclosed system solves this technical problem by providing a solution also rooted in computer technology, namely, by providing for automated controller configuration recommendations.

FIG. 1 illustrates an exemplary controller 100, according to certain aspects of the present disclosure. The controller 100 may include a directional pad 102, buttons 104, a left joystick 114, a right joystick 116, a left bumper 106, a right bumper 108, a left trigger 110, and a right trigger 112. The controller 100 may also include a trackpad 118 and additional buttons (e.g., additional button 120). In an implementation, the left joystick 114 and/or the right joystick 116 may be configured to be depressed downward to provide additional avenues of input from the joysticks 114, 116.

According to aspects, the directional pad 102 may include buttons corresponding to up, down, left, and right. According to aspects, the buttons 104 may include at least one button or more. It is understood that although four buttons 104 are illustrated, more or less buttons 104 may be included without departing from the scope of the disclosure.

According to aspects, the directional pad 102, left joystick 114, left bumper 106, and left trigger 110 may be controlled by a user's left hand. For example, the user's left thumb may be used to control the left joystick 114 or the directional pad 102, and the user's left index finger may be used to control the left bumper 106 and/or the left trigger 110. According to aspects, the right joystick 116, the buttons 104, the right bumper 108, and the right trigger 112 may be controlled by a user's right hand. For example, the user's right thumb may be used to control the right joystick 116 or the buttons 104, and the user's right index finger may be used to control the right bumper 108 and/or the right trigger 112.

As described above, there are limitations to a user's ability to interact with the controller 100. For example, the user's left thumb may be used to control either the left joystick 114 or the directional pad 102, but not both at the same time. Similarly, the user's right thumb may be used to control either the right joystick 116 or the buttons 104, but not both at the same time. Therefore, in certain scenarios, it would be extremely difficult for the user to direct their intent through the controller 100 because of these shortcomings in the controller design and/or button mapping. Additionally, the sensitivities of the joysticks 114, 116 may not be optimized for the user, which may cause unintended errors by the user.

According to aspects, the controller 100 may be utilized to interact with software. For example, the software may include video games, a flight simulator, a driving simulator, etc. It is understood that the software includes real world devices as well, including, but not limited to, car software, audio recording software, production software, etc.

It is understood that the illustrated controller 100 is exemplary only, and other controllers may be included without departing from the scope of the disclosure. For example, the controller may be an analog/digital controller, and may include a gamepad, a footpad, a control surface, a navigation controller (e.g., for navigating a car, airplane, space ship, etc.), a handicapped accessible controller, steering wheel, flight stick, pedals, etc. It is further understood that each controller type may include similar shortcomings to those described above for the controller 100.

It is understood that controller inputs may be assigned to single and/or multiple functions based on contexts of the software that is running (e.g., a user that gets into a vehicle or opens a menu via object interactions would have different inputs/functions). It is further understood that the controllers may be digital devices (e.g., controller outputs to may be digital outputs), but some of the inputs may be analog in nature (e.g., input may be an analog input from a human user).

Figure 2:
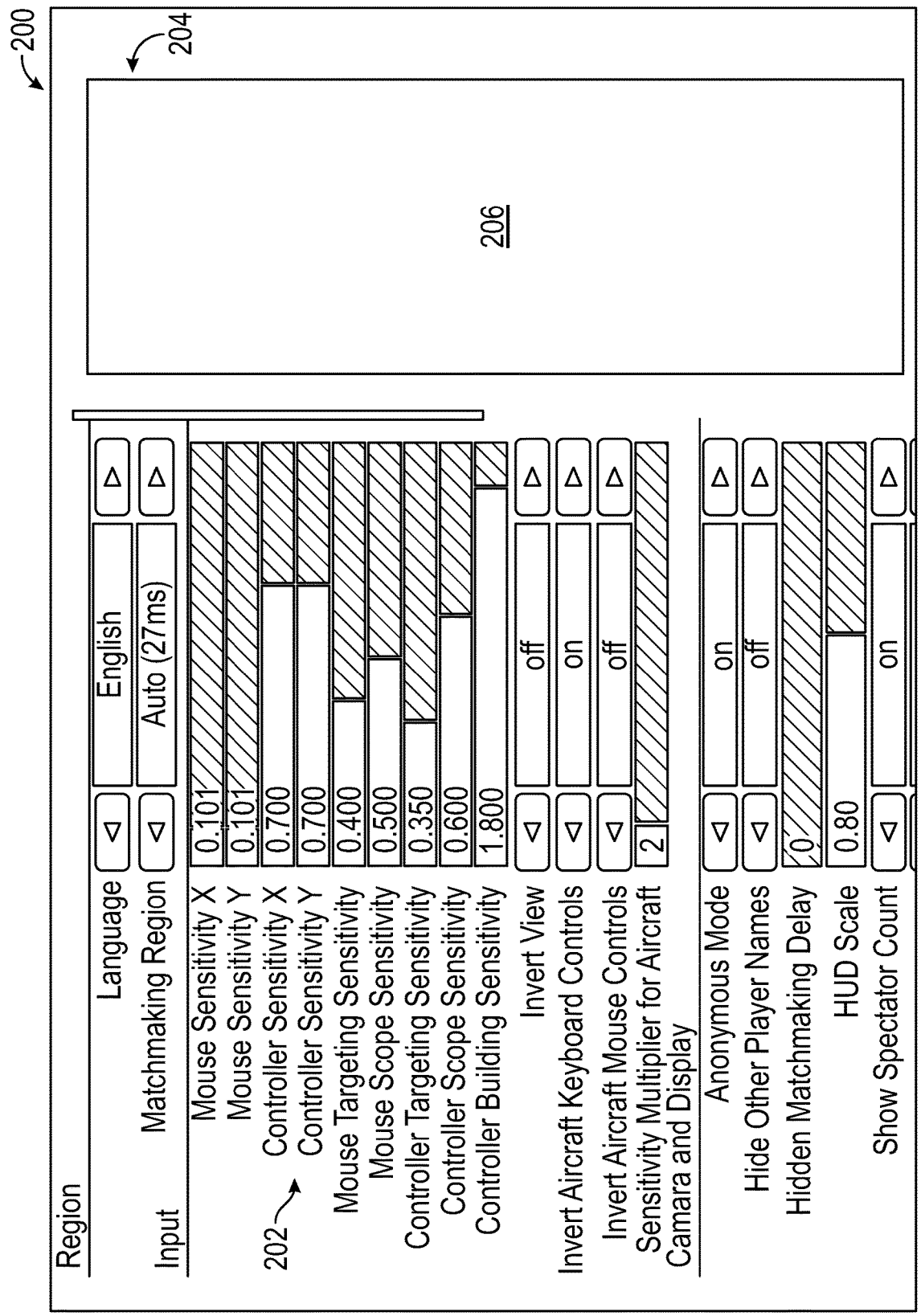
FIG. 2 illustrates an exemplary graphical user interface (GUI) for adjusting settings of a controller, according to certain aspects of the present disclosure.

FIG. 2 illustrates an exemplary graphical user interface (GUI) 200 for automatically adjusting controller settings (e.g., settings of a controller), according to certain aspects of the present disclosure. The GUI 200 may include a listing of controller settings 202 and a log 204 of implemented adjustments 206 (e.g., recommendations). In an implementation, the GUI 200 may include an option for a user to enable or disable automated adjustments to the settings of the controller.

According to aspects, a machine learning system may account for how users are interfacing with software (e.g., a simulation, a video game, a developer tool, etc.) through a controller (e.g., an analog/digital controller including a gamepad, keyboard and mouse, a control surface, a handicapped accessible controller, steering wheel, flight stick, pedals, etc.). The system may provide recommendations 206 for configuration settings of the controller to aid each user's respective tendencies. In an implementation, machine learning may be utilized to build a model that maps player skill level/play style built from all gathered player telemetry and settings to recommend changes to their control setup to improve certain aspects of how they play. For example, user performance data may be gathered through telemetry of the software. Additionally, configuration profiles (e.g., user profiles) can be shared on a social media platform and updated over time. The system may also account for configuration settings that are used by the most skilled users, and then makes a comparison to users who have similar tendencies to form recommendations.

For example, in a soccer video game, a skilled user may be associated with a particular team composition, and the skilled user may also have remapped controller assignments (e.g., reassigned buttons) that make it easier to play with that team more aggressively. As such, any player who has a similar team composition that also plays aggressively may receive a recommendation to similarly remap their controller assignments according to the skilled user's profile in order to improve their playstyle.

As another example, in a first-person shooter game, it may be determined that a player is often shot from behind. As a result, the system may recommend increasing turning sensitivity. Furthermore, if the player's aim with recoil removed is often sporadic and/or off target, the system may recommend reduced sensitivity while aiming down iron sites. The system may also recommend, for a current ranking level, that most users changed their button mappings for a jumping action from a face button (e.g., button 104) to a bumper (e.g., right bumper 108), and so the player should also consider a similar change to button mappings.

It is understood that the described techniques apply equally to configuring analog inputs (e.g., based on sensitivity curves, etc.) as well as the above-described layout configuration, which may also include digital inputs (e.g., remapping buttons/inputs).

The system may also be utilized to account for in-game changes that impact configuration settings. For example, in a first-person shooter game, a sniper rifle may have higher recoil in a subsequent patch to the game. In order to compensate for this change, the system may recommend a change in input sensitivity.

According to aspects, a configuration profile (e.g., user profile) may be generated for each user that includes the customized settings each user has for their controller. The user profile may include at least a skill level and an input tendency of the user. Each configuration profile may be shared to social media so that other users may search for and use profiles that are popular in their game/software communities. For example, these configuration profiles may be game setting specific and may naturally iterate over time so those changes can be pushed to other users' games/software automatically. Additionally, the integration with a social platform would aid in reinforcing the machine learning system so that it may stay updated regarding which configurations are most utilized and whether users are enjoying them.

According to aspects, the user may be presented with a short questionnaire to aid the machine learning model in determining recommendations 206 to the user. For example, the user may specify a playstyle (e.g., offensive, defensive), preferred weapons, competitiveness, etc. From there, the user may begin interacting with the software (e.g., video game, simulator, etc.) and the machine learning system will make recommendations 206 accordingly. In an implementation, the user may be presented with each recommendation 206 and given the option whether to accept or deny the recommendation 206. The log 204 may be updated to reflect each change that was made. The log 204 may also include a history of which recommendations were accepted or denied as well. With each choice by the user, the machine learning system may understand better how to adjust the controller settings to fit the tendencies of that specific user.

According to aspects, the recommendations 206 may be incremental, so that the user is able to adjust to the new controller settings. For example, if the user is accustomed to a joystick sensitivity setting of 5, and the sensitivity is suddenly increased to 10, then the user will likely not be able to interact as efficiently with the software because the change is too large. Instead, the system may increase the sensitivity incrementally to allow the user time to become accustomed to the new settings. Eventually, the user may be able to have a sensitivity of 10. In an implementation, the adjustments may be implemented automatically through continuous monitoring so that the user slowly becomes more adept with each new adjustment over time.

According to aspects, the recommendations 206 may be based on user performance. For example, player statistics, hit percentages, defensive tendencies, offensive tendencies, player ratios, etc., may be utilized for recommendations 206. In an implementation, these factors that influence the reconfiguration of the controller settings may be displayed to the user through the GUI 200. In an implementation, the system may be configured by the user to query the user for user approval for recommendations 206. The system may also be configured to automatically/dynamically implement the recommendations 206, if desired by the user. For example, the user may toggle an ON/OFF switch through the GUI 200. The ON/OFF switch may control whether to query the user for approval (e.g., switch is OFF), or to automatically/dynamically implement the recommendations 206 (e.g., switch is ON).

According to aspects, the recommendations 206 generated by the machine learning system may be utilized to improve accessibility to users with disabilities as well. For example, it may help users discover more suitable accessibility settings. Furthermore, it is understood that the recommendations 206 may be applied to any type of analog/digital controller, including, but not limited to, a gamepad, a footpad, a control surface, a navigation controller (e.g., for navigating a car, airplane, space ship, etc.), a handicapped accessible controller, steering wheel, flight stick, pedals, etc. In this way, the recommendations 206 may be applied in various contexts, including, but not limited to, video games, simulators, etc., for both disabled and non-disabled users.

According to aspects, the machine learning system may include algorithms, including but not limited to, machine learning algorithms, if/then telemetry engines, etc. As described herein, some non-limiting examples of machine learning algorithms that can be used to generate the recommendations 206 may include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

Figure 3:
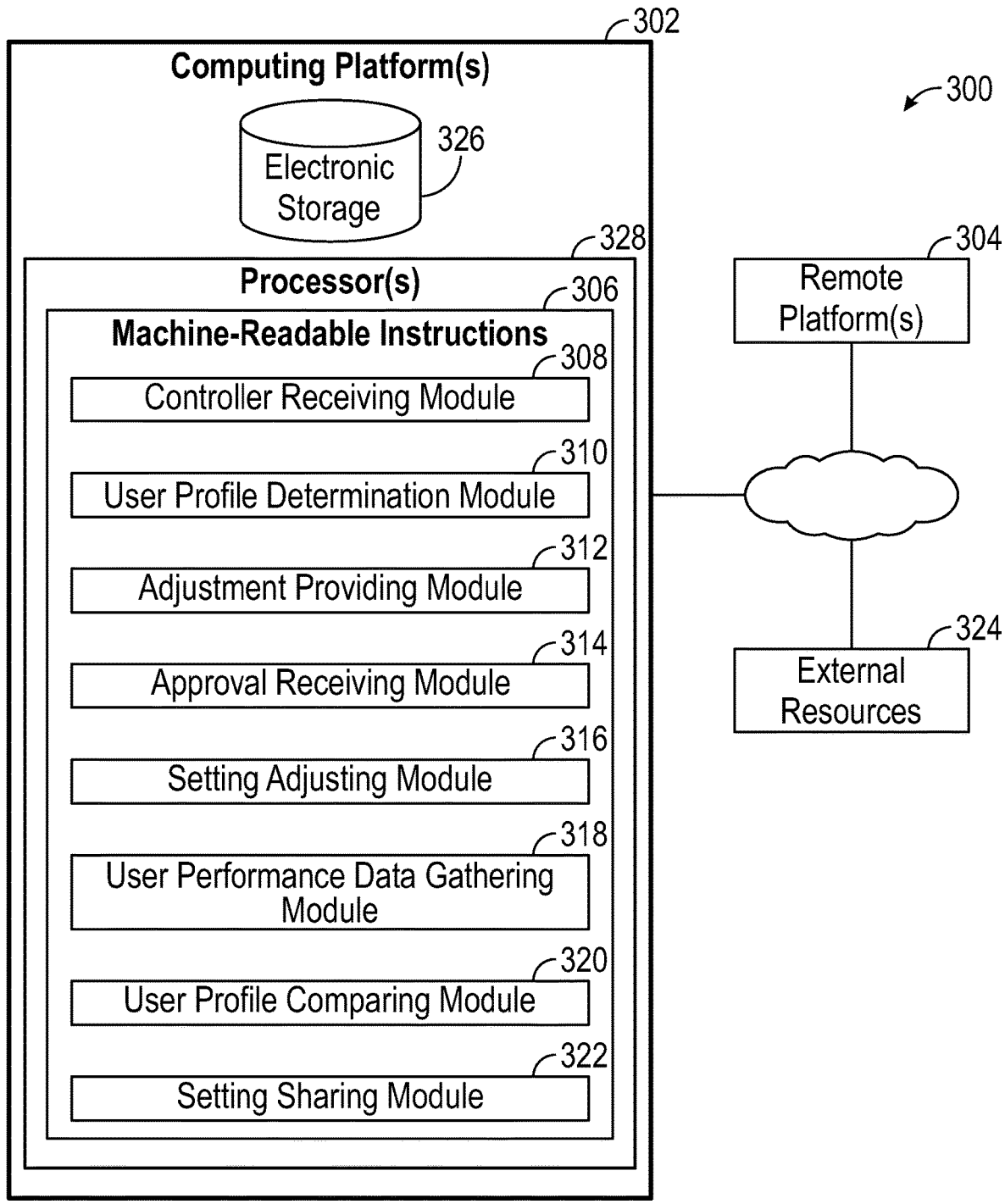
FIG. 3 illustrates a system configured for adjusting settings of a controller, in accordance with one or more implementations.

FIG. 3 illustrates a system 300 configured for adjusting controller settings (e.g., settings of a controller), in accordance with one or more implementations. In some implementations, system 300 may include one or more computing platforms 302. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via remote platform(s) 304.

Computing platform(s) 302 may be configured by machine-readable instructions 306. Machine-readable instructions 306 may include one or more instruction modules. The instruction modules may include computer program modules. The instruction modules may include one or more of controller receiving module 308, user profile determination module 310, adjustment providing module 312, approval receiving module 314, setting adjusting module 316, user performance data gathering module 318, user profile comparing module 320, setting sharing module 322, and/or other instruction modules.

Controller receiving module 308 may be configured to receive, through a controller associated with a user, controller input for software. By way of non-limiting example, the software may include at least one of a flight simulator, a driving simulator, or a video game.

User profile determination module 310 may be configured to determine, based on the controller input, a user profile for the user including at least a skill level and an input tendency of the user.

Adjustment providing module 312 may be configured to provide suggested adjustments to settings of the controller intended to improve performance of the user in relation to the software. The suggested adjustments may be incremental. The suggested adjustments may be based at least or in part on a machine learning model. By way of non-limiting example, the machine learning model may include at least one of a regression algorithm, an instance-based algorithm, a decision tree algorithm, a Bayesian algorithm, a clustering algorithm, an association rule learning algorithm, an artificial neural network algorithm, a deep learning algorithm, a dimensionality reduction algorithm, or an ensemble algorithm. The settings of the controller may include at least one of controller sensitivity or controller assignments.

Adjustment providing module 312 may be configured to provide the suggested adjustments based on the comparing.

Approval receiving module 314 may be configured to receive approval of the user to implement the suggested adjustments to the settings of the controller.

Setting adjusting module 316 may be configured to adjust the settings of the controller based on the approval of the user.

User performance data gathering module 318 may be configured to gather user performance data through telemetry of the software.

User profile comparing module 320 may be configured to compare the user profile of the user with other user profiles of other users.

Setting sharing module 322 may be configured to share the settings of the controller for the user with other users. According to aspects, the described systems may not be linked or connected for the system to function. For example, a car may have a trained model installed that does not communicate with any external network in order to function.

In some implementations, by way of non-limiting example, the controller may be an analog controller and/or digital controller, and may include at least one of a gamepad, a footpad, a control surface, a navigation controller, a handicapped accessible controller, steering wheel, flight stick, or pedals. In some implementations, by way of non-limiting example, the controller may include at least one of a light sensor, an audio sensor, or a tactile sensor. The controller may also include embedded computing systems (e.g., such as for a car).

In some implementations, computing platform(s) 302, remote platform(s) 304, and/or external resources 324 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 324 may be operatively linked via some other communication media.

A given remote platform 304 may include one or more processors configured to execute computer program modules. The computer program modules may be configured to enable an expert or user associated with the given remote platform 304 to interface with system 300 and/or external resources 324, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 324 may include sources of information outside of system 300, external entities participating with system 300, and/or other resources. In some implementations, some or all of the functionality attributed herein to external resources 324 may be provided by resources included in system 300.

Computing platform(s) 302 may include electronic storage 326, one or more processors 328, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 326 may comprise non-transitory storage media that electronically stores information. The electronic storage media of electronic storage 326 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 326 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 326 may include one or more virtual storage resources (e.g., cloud storage, a virtual private network, and/or other virtual storage resources). Electronic storage 326 may store software algorithms, information determined by processor(s) 328, information received from computing platform(s) 302, information received from remote platform(s) 304, and/or other information that enables computing platform(s) 302 to function as described herein.

Processor(s) 328 may be configured to provide information processing capabilities in computing platform(s) 302. As such, processor(s) 328 may include one or more of a digital processor, an analog processor, a digital circuit designed to process information, an analog circuit designed to process information, a state machine, and/or other mechanisms for electronically processing information. Although processor(s) 328 is shown in FIG. 3 as a single entity, this is for illustrative purposes only. In some implementations, processor(s) 328 may include a plurality of processing units. These processing units may be physically located within the same device, or processor(s) 328 may represent processing functionality of a plurality of devices operating in coordination. Processor(s) 328 may be configured to execute modules 308, 310, 312, 314, 316, 318, 320, and/or 322, and/or other modules. Processor(s) 328 may be configured to execute modules 308, 310, 312, 314, 316, 318, 320, and/or 322, and/or other modules by software; hardware; firmware; some combination of software, hardware, and/or firmware; and/or other mechanisms for configuring processing capabilities on processor(s) 328. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 314, 316, 318, 320, and/or 322 are illustrated in FIG. 3 as being implemented within a single processing unit, in implementations in which processor(s) 328 includes multiple processing units, one or more of modules 308, 310, 312, 314, 316, 318, 320, and/or 322 may be implemented remotely from the other modules. The description of the functionality provided by the different modules 308, 310, 312, 314, 316, 318, 320, and/or 322 described below is for illustrative purposes, and is not intended to be limiting, as any of modules 308, 310, 312, 314, 316, 318, 320, and/or 322 may provide more or less functionality than is described. For example, one or more of modules 308, 310, 312, 314, 316, 318, 320, and/or 322 may be eliminated, and some or all of its functionality may be provided by other ones of modules 308, 310, 312, 314, 316, 318, 320, and/or 322. As another example, processor(s) 328 may be configured to execute one or more additional modules that may perform some or all of the functionality attributed below to one of modules 308, 310, 312, 314, 316, 318, 320, and/or 322.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4:
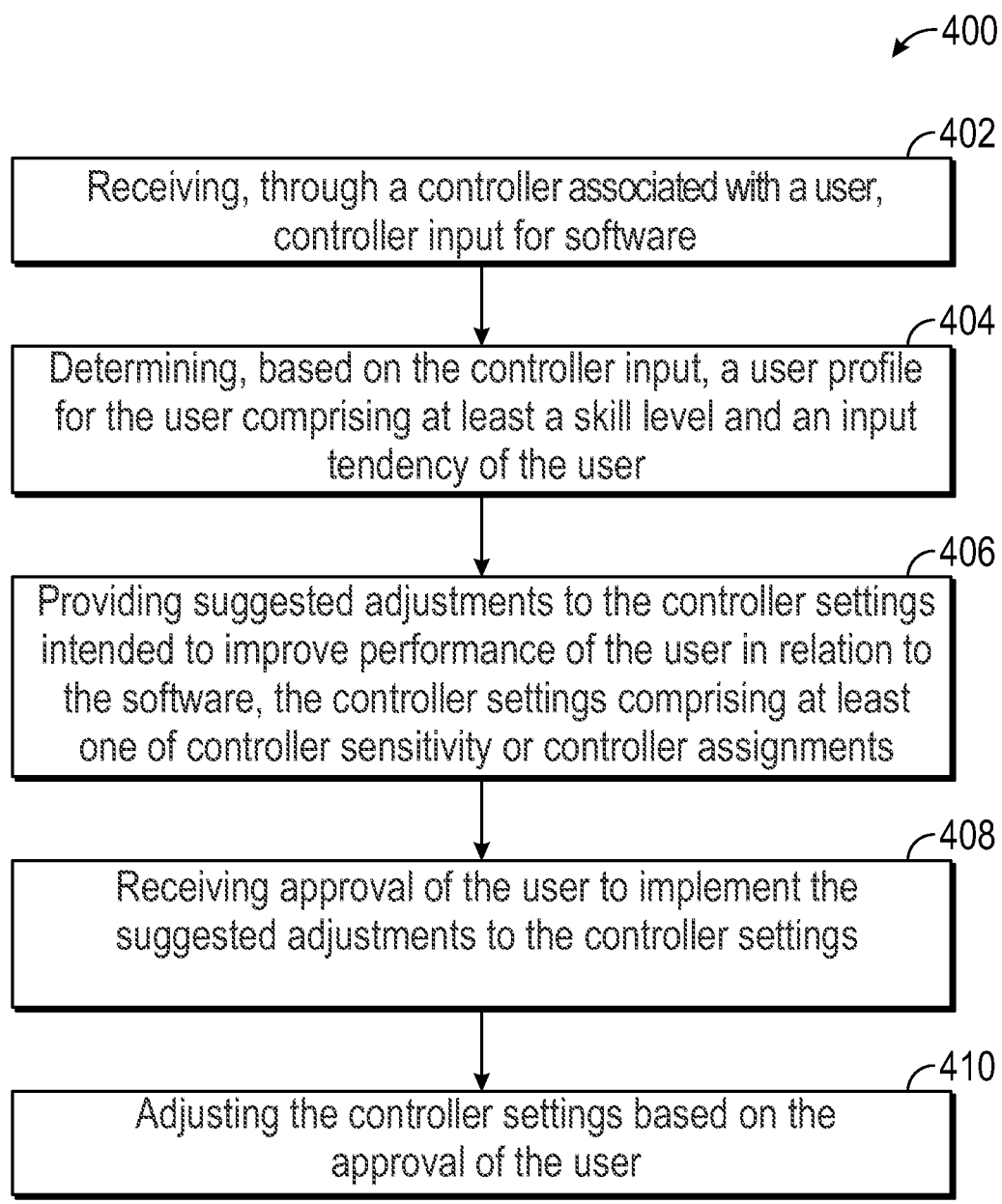
FIG. 4 illustrates an example flow diagram for adjusting settings of a controller, according to certain aspects of the disclosure.

FIG. 4 illustrates an example flow diagram (e.g., process 400) for adjusting controller settings, according to certain aspects of the disclosure. For explanatory purposes, the example process 400 is described herein with reference to FIGS. 1-3. Further for explanatory purposes, the steps of the example process 400 are described herein as occurring in serial, or linearly. However, multiple instances of the example process 400 may occur in parallel. For purposes of explanation of the subject technology, the process 400 will be discussed in reference to FIGS. 1-3.

At step 402, controller input for software is received through a controller associated with a user. At step 404 a user profile for the user is determined based on the controller input from the user. The user profile may include at least a skill level and an input tendency of the user.

At step 406, suggested adjustments to the controller settings are provided, which are intended to improve performance of the user in relation to the software. The controller settings may include at least one of controller sensitivity or controller button assignments.

At step 408, approval is received of the user to implement the suggested adjustments to the controller settings. At step 410, the controller settings are adjusted based on the approval of the user.

For example, as described above in relation to FIGS. 1-3, at step 402, controller input is received (e.g., by controller receiving module 308) for software through a controller 100 associated with a user. At step 404 a user profile for the user is determined (e.g., by user profile determination module 310) based on the controller input from the user. The user profile may include at least a skill level and an input tendency of the user. At step 406, suggested adjustments 206 to settings of the controller are provided (e.g., through GUI 200), which are intended to improve performance of the user in relation to the software. The settings 202 of the controller 100 may include at least one of controller sensitivity or controller button assignments (e.g., controller settings 202). At step 408, approval is received of the user to implement the suggested adjustments 206 to the settings 202 of the controller 100. At step 410, the settings 202 of the controller 100 are adjusted based on the approval of the user.

According to an aspect, the controller may be an analog controller and/or digital controller (e.g., analog/digital controller) that includes at least one of a gamepad, a footpad, a control surface, a navigation controller, a handicapped accessible controller, steering wheel, flight stick, or pedals. According to an aspect, the software includes at least one of a flight simulator, a driving simulator, or a video game.

According to an aspect, the suggested adjustments are incremental. According to an aspect, the controller comprises at least one of a light sensor, an audio sensor, or a tactile sensor.

According to an aspect, the suggested adjustments are based at least in part on an algorithm. For example, the algorithm may include a machine learning model, an if/then telemetry engine, etc. According to an aspect, the machine learning model may include at least one of a regression algorithm, an instance-based algorithm, a decision tree algorithm, a Bayesian algorithm, a clustering algorithm, an association rule learning algorithm, an artificial neural network algorithm, a deep learning algorithm, a dimensionality reduction algorithm, or an ensemble algorithm.

According to an aspect the process 400 may further include gathering user performance data through telemetry of the software. According to an aspect the process 400 may further include sharing the settings of the controller for the user with other users.

According to an aspect the process 400 may further include comparing the user profile of the user with other user profiles of other users. According to an aspect the process 400 may further include providing the suggested adjustments based on the comparing.

Figure 5:
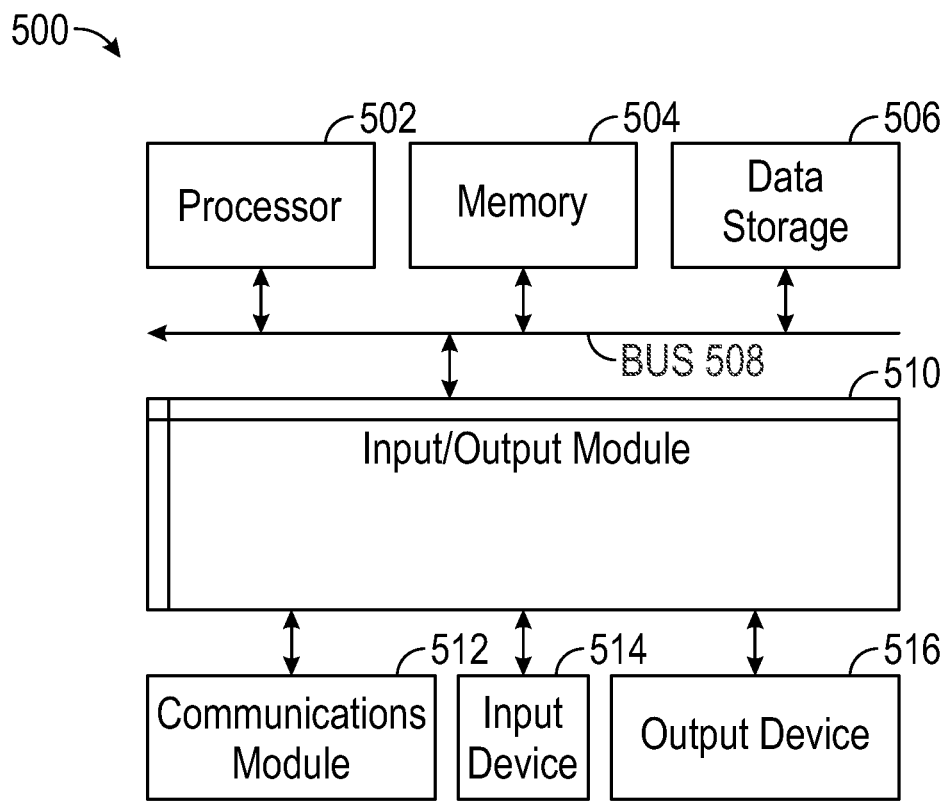
FIG. 5 is a block diagram illustrating an example computer system (e.g., representing both client and server) with which aspects of the subject technology can be implemented.

FIG. 5 is a block diagram illustrating an exemplary computer system 500 with which aspects of the subject technology can be implemented. In certain aspects, the computer system 500 may be implemented using hardware or a combination of software and hardware, either in a dedicated server, integrated into another entity, or distributed across multiple entities.

Computer system 500 (e.g., server and/or client) includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as an LCD (liquid crystal display) monitor, for displaying information to the user.

According to one aspect of the present disclosure, the above-described gaming systems can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in the main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 500 reads game data and provides a game, information may be read from the game data and stored in a memory device, such as the memory 504. Additionally, data from the memory 504 servers accessed via a network the bus 508, or the data storage 506 may be read and loaded into the memory 504. Although data is described as being found in the memory 504, it will be understood that data does not have to be stored in the memory 504 and may be stored in other memory accessible to the processor 502 or distributed among several media, such as the data storage 506.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for adjusting controller settings, comprising:
    identifying characteristics of a user associated with a user account associated with software, the characteristics indicating one or more of a playstyle or preferences of the user relative to the software;
    receiving, through controller components of a controller associated with the user account, controller inputs for interacting with the software;
    determining, based on the controller inputs and the characteristics, a user profile corresponding to the user, the user profile comprising at least a skill level and input tendencies of the user;
    providing suggested adjustments to the controller settings intended to improve performance of the user in relation to the software; and
    based on the suggested adjustment, updating the controller settings by remapping assignments of the controller components and changing controller sensitivity, wherein the suggested adjustments comprise incremental updates, the incremental updates being based on a machine learning model trained by the controller input to change the controller settings continuously over a period of time.

2. The computer-implemented method of claim 1, wherein the controller comprises an analog/digital controller, and includes at least one of a gamepad, a footpad, a control surface, a navigation controller, a handicapped accessible controller, steering wheel, flight stick, or pedals.

3. The computer-implemented method of claim 1, wherein the software comprises at least one of a flight simulator, a driving simulator, a video game, car software, audio recording software, or production software.

4. The computer-implemented method of claim 1, further comprising:
    gathering user performance data through telemetry of the software.

5. The computer-implemented method of claim 1, further comprising:
    comparing the user profile of the user with other user profiles of other users; and
    providing the suggested adjustments based on the comparing.

6. The computer-implemented method of claim 1, further comprising:
    sharing the controller settings for the user with other users.

7. The computer-implemented method of claim 1, wherein the controller comprises at least one of a light sensor, an audio sensor, or a tactile sensor.

8. The computer-implemented method of claim 1, further comprising:
    receiving, through a questionnaire, specifications of a playstyle of a user, wherein the suggested adjustments are based at least in part on an algorithm comprising the machine learning model trained at least in part by the controller input and the specifications received through the questionnaire.

9. The computer-implemented method of claim 8, wherein the machine learning model includes at least one of a regression algorithm, an instance-based algorithm, a decision tree algorithm, a Bayesian algorithm, a clustering algorithm, an association rule learning algorithm, an artificial neural network algorithm, a deep learning algorithm, a dimensionality reduction algorithm, or an ensemble algorithm.

10. A system for adjusting controller settings, comprising:
    a processor; and
    a memory comprising instructions stored thereon, which when executed by the processor, causes the processor to perform:
    identifying characteristics of a user associated with a user account associated with software, the characteristics indicating one or more of a playstyle or preferences of the user relative to the software;
    receiving, through controller components of a controller associated with the user account, controller inputs for interacting with the software;
    determining, based on the controller inputs and the characteristics, a user profile corresponding to the user, the user profile comprising at least a skill level and input tendencies of the user;
    providing suggested adjustments to the controller settings intended to improve performance of the user in relation to the software, the controller settings comprising at least one of sensitivity or assignments of the controller components; and
    based on the suggested adjustment, updating the controller settings by remapping assignments of the controller components and changing controller sensitivity, wherein the suggested adjustments comprise incremental updates, the incremental updates being based on a machine learning model trained by the controller input to change the controller settings continuously over a period of time.

11. The system of claim 10, wherein the controller comprises an analog/digital controller, and includes at least one of a gamepad, a footpad, a control surface, a navigation controller, a handicapped accessible controller, steering wheel, flight stick, or pedals.

12. The system of claim 10, wherein the software comprises at least one of a flight simulator, a driving simulator, a video game, car software, audio recording software, or production software.

13. The system of claim 10, further comprising stored sequences of instructions, which when executed by the processor, cause the processor to perform:
gathering user performance data through telemetry of the software.

14. The system of claim 10, further comprising stored sequences of instructions, which when executed by the processor, cause the processor to perform:
comparing the user profile of the user with other user profiles of other users; and
providing the suggested adjustments based on the comparing.

15. The system of claim 10, further comprising stored sequences of instructions, which when executed by the processor, cause the processor to perform:
sharing the controller settings for the user with other users.

16. The system of claim 10, wherein the controller comprises at least one of a light sensor, an audio sensor, or a tactile sensor.

17. The system of claim 10, further comprising stored sequences of instructions, which when executed by the processor, cause the processor to perform:
receiving, through a questionnaire, specifications of a playstyle of a user, wherein the suggested adjustments are based at least in part on an algorithm comprising the machine learning model trained at least in part by the controller input and the specifications received through the questionnaire.

18. A non-transitory computer-readable storage medium comprising instructions stored thereon, which when executed by one or more processors, cause the one or more processors to perform operations for adjusting controller settings, the operations comprising:
identifying characteristics of a user associated with a user account associated with software, the characteristics indicating one or more of a playstyle or preferences of the user relative to the software;
receiving, through controller components of a controller associated with the user account, controller inputs for interacting with the software;
determining, based on the controller inputs and the characteristics, a user profile corresponding to the user, the user profile comprising at least a skill level and input tendencies of the user;
providing suggested adjustments to the controller settings intended to improve performance of the user in relation to the software, the controller settings comprising at least one of sensitivity or assignments of the controller components; and
based on the suggested adjustment, updating the controller settings by remapping assignments of the controller components and changing controller sensitivity, wherein the suggested adjustments comprise incremental updates, the incremental updates being based on a machine learning model trained by the controller input to change the controller settings continuously over a period of time.

* * * * *